July 31, 1951  J. L. RAESLER  2,562,575
ELECTRONIC DEVICE FOR MEASURING PHYSICAL CONSTANTS
Filed Jan. 4, 1947
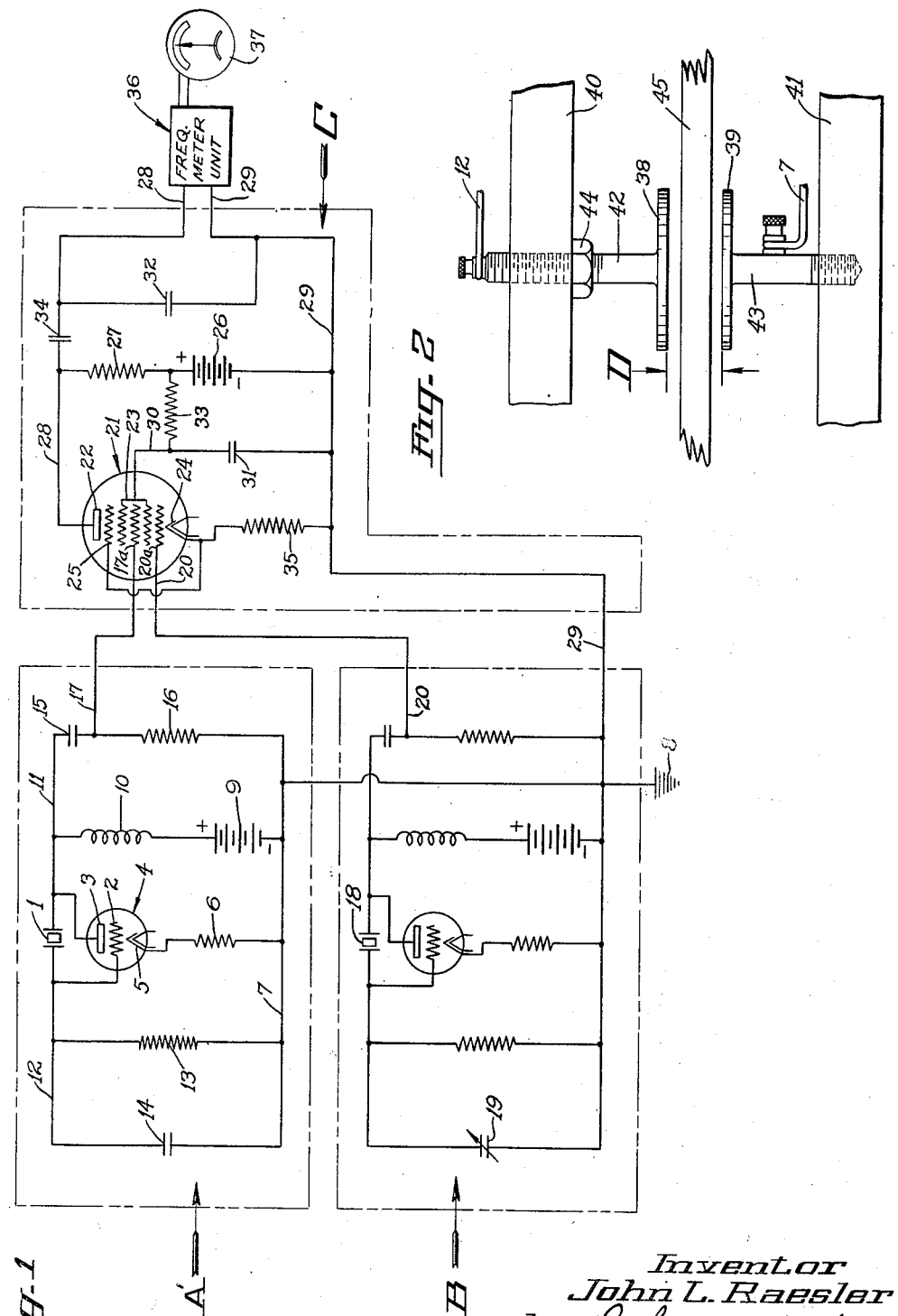
Inventor
John L. Raesler
by Parham + Bates
Attorneys Patented July 31, 1951

2,562,575

UNITED STATES PATENT OFFICE 2,562,575

ELECTRONIC DEVICE FOR MEASURING PHYSICAL CONSTANTS

John L. Raesler, Manchester, Conn., assignor to Emhart Manufacturing Company, a corporation of Delaware Application January 4, 1947, Serial No. 720,262

4 Claims. (Cl. 175—183)

This invention relates generally to improvements in the field of electronic devices and methods for ascertaining certain physical constants of given materials and electrical circuit elements. It pertains more particularly to the field of electronic measuring devices and methods for ascertaining the thickness of materials having given dielectric characteristics and for ascertaining the dielectric constants of given dielectric materials. This invention also pertains to a means for and method of accurately measuring small capacity differences between electrical condensers.

It is an object of the present invention to provide a simple, relatively inexpensive electronic device for measuring the thickness of dielectric materials with a high degree of accuracy.

It is also an object of this invention to provide a device that may be used to advantage in the manufacture and handling of dielectric materials as a comparator for showing the relative thickness of each of several samples of a given dielectric material.

A further object of this invention is the provision of means for and a method of rapidly and continuously measuring the thickness of plate glass samples with a high degree of accuracy, the measuring means requiring a minimum of attention and adjustment by a semi-skilled operator.

A further object of the present invention is the provision of electronic means for and a method of checking the wall thickness of glass jars and other containers made from dielectric materials.

Another object of the present invention is the provision of a means for and method of measuring the thickness of dielectric materials wherein the thickness-measuring elements are spaced away from the surfaces of the material to be measured.

It is also an object of the present invention to provide a means for and method of ascertaining the dielectric constants of each of several different dielectric materials of known thicknesses.

This invention also has as an object the provision of an electronic means and method which may be used to advantage in ascertaining the magnitude of small capacitances and capacitance changes of electrical condensers.

Additional objects and advantages of the present invention will become apparent in the course of the following description of a preferred embodiment of the invention, the details of which are shown for illustrative purposes only and do not constitute a limitation of the scope of the present invention. Specific reference will be made to the accompanying drawings, in which:

Fig. 1 is a schematic representation of an electronic circuit, embodying the present invention, in conjunction with a conventional frequency meter unit and indicating means; and Fig. 2 shows a measuring condenser and a sample of dielectric material in position therewith, the condenser being one element of the electronic circuit shown in Fig. 1.

The disclosed embodiment of the present invention contemplates the use of a certain type of crystal oscillator known as the "Pierce" oscillator. This scillator utilizes a crystal of the piezoelectric quartz type and will oscillate stably at the crystal frequency. An important characteristic of this type of oscillator is that the oscillation frequency may be changed slightly from the basic crystal frequency by varying the capacity of a certain condenser (hereinafter called a "measuring condenser") included in the oscillator circuit. One phase of this invention contemplates changes of capacity of the measuring condenser proportionate to the dielectric characteristics or thickness of a sample of material introduced between, but not touching, the plates of the condenser.

The capacity, "C," of two plates having conducting faces mutually parallel and spaced apart is given by the expression $$C = \frac{KA}{D}$$

where "A" is the area of one of the plates, "D" is the distance therebetween and "K" is the dielectric constant of the material between the plates of the condenser. The above expression is based on the assumption that the material of dielectric constant "K" completely occupies distance "D" between the condenser plates. It will be noted from this expression that if "A" and "D" be held constant, the capacity of the condenser may be varied correspondingly by variations of the value of "K." Thus, a given condenser having air as a dielectric between the condenser plates will have a given capacity. If glass or other dielectric material be inserted between the condenser plates, the capacity of the condenser will be materially increased inasmuch as the "K" value for various glasses ranges from 5 to 9 compared to a "K" value of 1 for air. If various thicknesses of materials, all having equal dielectric constants, are introduced between a pair of condenser plates, the capacity of the condenser will vary proportionate to the thickness of material inserted therebetween at any one time, the capacity increasing as the thickness of material inserted increases. The relationship of variations of capacity to thickness of the dielectric material will not be a linear function since a certain amount of air space will be included between the plates in addition to the given dielectric material.

It is the intention of the present invention to use the variation of capacity of a given measuring condenser to modify the crystal oscillation frequency of a "Pierce" type oscillator. A similar modification or modulation of the oscillation frequency may be accomplished by inserting between the plates of the measuring condenser samples of material having identical thicknesses but different dielectric constants. A further way of modifying the oscillation frequency would be to substitute for the above mentioned measuring condenser each of a series of condensers to be tested, each condenser having a slightly different capacity from each of the other condensers. Thus, it is noteworthy that the oscillation frequency of the "Pierce" oscillator may be made to vary according to variations in any of several types of materials or electrical elements to be measured.

It is within the contemplation of the present invention to provide two oscillator circuits of the "Pierce" type, one circuit including therein a measuring condenser and the second circuit including therein a variable condenser for calibration purposes. Each of these circuits includes a crystal of the piezoelectric quartz type, the crystals used being matched in their natural frequency and piezoelectric characteristics. The high frequency potential outputs of these circuits, as modulated in frequency by both the measuring and calibration condensers, may be fed to a mixing circuit which, by suitable design and construction, may be made responsive to the difference between the frequencies of the two oscillator outputs. This frequency difference or "beat" frequency may be fed to any one of a number of conventional metering and indicating circuits, the indicating circuit showing the difference between the oscillation frequencies of the oscillator circuits caused by the variation in capacity of the measuring condenser. It is also within the purview of the present invention to connect alarm circuits and devices to the mixing circuit of a suitable form to facilitate sorting and rejection of samples being investigated.

Referring first to Fig. 1 of the accompanying drawings, a "Pierce" crystal oscillator is generally designated "A'" and is inclosed by phantom lines. The frequency of oscillator "A'" is stably maintained at a relatively fixed value by crystal 1 and its associated circuit constants. Crystal 1 is connected to grid 2 and plate 3 of a triode, generally designated 4. Triode 4 is of a standard commercial variety, having an indirectly heated cathode 5 which is connected to one end of a resistor 6, the other end of the resistor 6 being connected to a common line 7 which is grounded at 8. Line 7 is also joined to the negative pole of a battery 9. An impedance 10, preferably having primarily inductive reactance, joins the positive pole of battery 9 to a line 11 which is connected in parallel to plate 3 of triode 4 and to one side of crystal 1. A line 12 is connected in parallel to the other side of crystal 1 and to grid 2 of triode 4. Connected in parallel between lines 7 and 12 are resistor 13 and condenser 14. Condenser 14 is the measuring condenser which has been generally referred to hereinbefore. The details of construction of condenser 14 and its precise function in the present embodiment of this invention will be described hereinafter. Connected in series between lines 11 and 7 are condenser 15 and resistor 16. An output line 17 is connected between the condenser 15 and resistor 16 and leads to a mixing circuit to be described presently.

The capacity of condenser 14 is instrumental in the stable oscillation of the above outlined circuit, slight variations of the capacity of the condenser producing changes of frequency of the oscillator in the order of a small fraction of one per cent of the basic crystal frequency. Resistor 13 is useful as a restrictive leakage path between grid 2 and ground connection 8. Resistor 6 is instrumental in limiting the cathode-to-plate current. The inductive reactance of impedance 10 at high frequencies is instrumental in the regulation of the potential build-up at plate 3 and crystal 1. Resistor 16 permits a restricted leakage path for current between condenser 15 and the ground.

Inasmuch as the oscillator circuit is well known in the art, no further details of its operating characteristics will be described. The over-all effect of the oscillator circuit is to produce in the line 17 a high frequency sinusoidal potential, the frequency of which is determined, in part, by the capacity of condenser 14.

Shown also in Fig. 1 is a second "Pierce" oscillator, generally designated "B" and inclosed by phantom lines. Crystal 18 in this oscillator circuit is matched in its piezoelectric characteristics and natural frequency with crystal 1 of oscillator "A'." The other circuit elements of oscillator "B" are identical in value and function to the circuit elements of oscillator "A'" except for variable condenser 19 which has a capacity range similar to the capacity range of condenser 14 over its extreme range of operation as a measuring condenser. For any given setting of condenser 19, circuit "B" will oscillate stably at a constant frequency and put out a sinusoidal potential of this frequency in output line 20.

Inclosed by phantom lines in Fig. 1 is an electronic mixing circuit, generally designated "C." The mixing circuit contains a mixer tube, generally designated 21. As shown in the drawing, lines 17 and 20 are connected to control grids 17a and 20a, respectively, of the mixer tube. The mixer tube also contains a plate 22, a screen grid 23 and an indirectly heated cathode 24. Cathode 24 is connected to another grid 25 of the mixer tube. A battery 26 is provided in the mixing circuit, the positive pole of the battery being connected to one end of a resistor 27, the other end of which is connected to line 28. The negative pole of the battery is connected to line 29 which is at ground potential. A line 30, containing condenser 31, joins line 29 to screen grid 23. A resistor 33 is connected to line 30 and the positive pole of battery 26. A by-pass condenser 34 is provided in line 28, and a filter condenser 32 is connected between lines 28 and 29. Line 29 is connected to cathode 24 through resistor 35.

Lines 28 and 29 lead from the mixing circuit to a frequency meter unit, generally designated 36. The frequency meter unit may be any one of a number of well known, commercially available types and may include in its circuit an indicating meter, indicated at 37.

The operation of the mixer circuit is as follows: Two high frequency sinusoidal potentials are fed to grids 17a and 20a of the mixer tube. The frequencies of these sinusoidal inputs may be slightly different. The beat frequency or numerical difference between the frequencies being fed to grids 17a and 20a, is the quantity the measure of which will be an indication of the capacity deviations of the measuring condenser 14 from a preferred value. Screen grid 23 is instrumental in reducing the grid-to-plate capacity of the mixer tube which is normally considered objectionable in a circuit such as the one shown. Resistor 35 is instrumental in limiting the plate-to-cathode current. Resistor 33 and condenser 31 aid in maintaining the proper D. C. potential on screen grid 23. Resistor 27 acts as a load resistor for tube 21 across which the output voltage (beat frequency) is developed. By choosing a condenser 32 of a suitable value, the high frequency components introduced into the mixer circuit by the "Pierce" oscillators may be effectively filtered out, permitting an output to lines 28 and 29 at a frequency equal to the beat frequency. The frequency meter unit 36 may, in turn, put out a potential to meter 37 proportionate to the beat frequency, meter 37 reading directly thereon a quantity proporionate to the beat frequency, or calibrated in suitable units for the measurements being made.

As shown in Fig. 2, measuring condenser 14 may be of a relatively simple construction consisting of two parallel plates 38 and 39 adjustably secured to spaced insulating blocks 40 and 41 by perpendicular attaching stems 42 and 43, respectively. To permit a ready adjustment of distance "D" to accommodate dielectric material 45, stem 42 may be threaded and provided with a lock nut 44. It will be obvious to those skilled in the art that Fig. 2 is basically a schematic representation of condenser 14. Condenser 14 may be made in a great variety of ways, the distance "D" and area "A" being variable at will to meet the operational requirements of the associated electronic circuit and the manner of varying distance "D" being accomplished in any one of several well known ways.

A measuring condenser of the type shown in Fig. 2 is suitable for making thickness measurements of plate glass. The plates of the condenser may be flat or curved suitably when the condenser is to be used for making thickness measurements of curved glass specimens, such as walls of glass jars and other containers. Also, if desired or advantageous, the plates may be pivotally secured to the insulating blocks.

Condenser 14, as illustrated, shows one measuring plate on each side of a sample of dielectric material 45 placed therebetween. It is within the purview of this invention to place both measuring plates of the condenser on the same side of the material sample. However, it is believed that the illustrated disposition of the condenser plates is a more desirable construction.

When the circuit shown in Fig. 1 is used for measuring the thickness of a series of samples of a given dielectric material, the over-all operation of the circuit is as follows: Distance "D" between the measuring plates of condenser 14 may be adjusted to accommodate a sample of the dielectric material of a preferred and known thickness. With the preferred sample in place in condenser 14, condenser 19 may be adjusted until meter 37 indicates a reading proportionate to the known thickness of the preferred sample in condenser 14. After the above calibration has been completed, a second sample of the dielectric material may be inserted in the measuring condenser. If the thickness of the second sample is identical to that of the first sample, no change in reading will be indicated by meter 37. However, if the second sample is different in thickness from the first sample, a change in reading of meter 37 will result, the meter indicating the thickness of the new sample being measured.

Under the foregoing operating conditions, the operation of the electrical circuit will be as follows: With the first sample in place in measuring condenser 14 and with condenser 19 suitably adjusted to give a preferred reading on meter 37, the oscillation frequency of oscillators "A" and "B" will be dissimilar and a preferred beat frequency will be fed to mixing circuit "C." If the thickness of the second sample introduced in the measuring circuit is different from the thickness in the first sample, the capacity of condenser 14 will be changed slightly and a change in the oscillation frequency of oscillator "A'" will result. Under these conditions, a different frequency will be fed to the mixing circuit from oscillator circuit "A'." A beat frequency different from the preferred beat frequency will be fed to lines 28 and 29 leading to the frequency meter unit, and the magnitude of the new beat frequency will be indicated on meter 37. The meter will indicate a zero reading when no dielectric sample is between the plates of the condenser, a zero beat frequency being fed to the frequency meter unit by the mixing circuit under these conditions.

It will be obvious that the foregoing procedure may be repeated with a great number of samples to be tested, the thickness of the sample in each case being indicated by meter 37. It is noteworthy that, once the circuit is calibrated, no other attention of the operator will be required and that measurements of the thicknesses of the samples may be made simply by inserting each sample in turn between the plates of the measuring condenser. It is also noteworthy that the plates of the condenser need not touch or bear on the surface of the sample to be checked, thus obviating the possibility of scratching or in other ways marring the surface of the material being measured.

By a suitable adjustment of condenser 19, the disclosed device may be easily adapted for use as a comparator. Used as such, this device may be of great value in indicating the magnitude of deviations of a series of samples of a given dielectric material from the thickness of a preferred sample. When used as a comparator, a zero beat frequency should obtain by virtue of the adjustment of condenser 19 when a preferred sample is inserted in the measuring condenser.

It is noteworthy that the disclosed device may also be used to advantage to measure the dielectric constant of a series of dissimilar dielectric materials. Thus, if the samples of materials are prepared with substantially the same thickness, the reading of meter 37 will be proportional to the dielectric constant of the material introduced in the measuring condenser. If the samples to be measured have known but different thicknesses, a suitable correction factor must be applied to the meter reading in determining the dielectric constant of the material.

It is also possible to use the disclosed circuit to measure the capacity of each of a series of small capacitances or condensers. Used in this way, condenser 14 may be replaced by each condenser to be measured each time a measurement is made. The circuit may be calibrated for this type of application by placing in oscillator "A'" in place of condenser 14 a calibration condenser having a preferred capacity. At this time, condenser 19 may be adjusted to give a preferred or zero reading on meter 37. After the foregoing calibration, the calibration condenser may be removed from oscillator circuit "A'" and may be replaced by another condenser, the capacity of which is to be ascertained. The reading of meter 37 will indicate the difference in capacity between the calibration condenser and the condenser measured or the true capacity of the condenser being measured, depending on whether the measuring circuit is being used as a comparator or as an absolute measuring device, respectively.

Having thus described my invention and several of its practical applications, I claim:

1. In combination in an electronic dielectric thickness measuring device, a crystal oscillator having a regulable and preselected constant high frequency output, a second crystal oscillator having a high frequency output, said second oscillator having a measuring condenser therein to which its output frequency is responsive, said measuring condenser having a capacity varied accordingly to thickness of a dielectric material introduced thereinto, a mixing circuit responsive to the difference between the output frequencies of said first and second named crystal oscillators, and means associated with said mixing circuit to indicate the magnitude of the frequency difference.

2. In combination in an electronic dielectric thickness measuring device, a "Pierce" type crystal oscillator having a regulable and preselected constant high frequency potential, a second "Pierce" type crystal oscillator having a high frequency potential, the frequency output of which is influenced by the thickness of dielectric material being measured, a mixing circuit responsive to the frequencies of said first and second high frequency sources, and means associated with said mixing circuit to indicate the difference in frequency between the frequency outputs of said sources.

3. Apparatus as defined in claim 1 in which said crystal oscillators are of the "Pierce" type.

4. Apparatus as defined in claim 1 wherein said measuring condenser comprises a pair of parallel, spaced condenser plates and insulator blocks to which said plates are adjustably secured.

JOHN L. RAESLER.

REFERENCES CITED

The following references are of record in the file of this patent:

UNITED STATES PATENTS

| Number | Name | Date |
|---|---|---|
| 1,431,638 | Dowling | Oct. 10, 1922 |
| 1,878,109 | Clark | Sept. 20, 1932 |
| 2,137,304 | Parkin | Nov. 22, 1938 |
| 2,222,221 | Burford | Nov. 19, 1940 |
| 2,266,114 | Bartlett | Dec. 16, 1941 |
| 2,315,945 | Downey | Apr. 6, 1943 |
| 2,337,328 | Hathaway | Dec. 21, 1943 |
| 2,393,717 | Speaker | Jan. 29, 1946 |
| 2,422,742 | Odessey | June 24, 1947 |
| 2,458,760 | Andersen | Jan. 11, 1949 |

OTHER REFERENCES

Machinery, vol. 28, Sept. 1921, pages 36 and 37.
Electronics, Oct. 1945, pages 114 and 115.